United States Patent [19]
Gately et al.

[11] Patent Number: 5,192,492
[45] Date of Patent: Mar. 9, 1993

[54] METHOD AND APPARATUS FOR FLUID SEALING OF STEAM GENERATOR

[75] Inventors: Daniel M. Gately, Peekskill, N.Y.; Louis J. Zezza, Brookfield, Conn.; William R. Masetti, White Plains, N.Y.

[73] Assignee: Consolidation Edison Company of New York, Inc., New York, N.Y.

[21] Appl. No.: 724,389

[22] Filed: Jun. 28, 1991

[51] Int. Cl.$^5$ .............................................. G21C 13/00
[52] U.S. Cl. ...................................... 376/203; 376/287
[58] Field of Search .................... 376/203, 287; 277/9, 277/12, 22, 36; 137/253

[56] References Cited

U.S. PATENT DOCUMENTS 4,305,591 12/1981 de Sivry et al. .................... 277/34
4,703,936 11/1987 Clark, Jr. et al. ..................... 277/1

FOREIGN PATENT DOCUMENTS 0369307 5/1990 European Pat. Off. .

OTHER PUBLICATIONS

PCT WO90/15417 Publication Date Dec. 13, 1990 McDonald.

Primary Examiner—Donald P. Walsh
Assistant Examiner—Meena Chelliah
Attorney, Agent, or Firm—Brooks Haidt Haffner & Delahunty

[57] ABSTRACT

Method and apparatus for maintaining a water level which immerses heat exchanger tubes, containing radioactive emitting material, within an inner shell of a steam generator while permitting space between the inner shell and a coaxial outer shell to be free of water during operations performed by workmen in such space after the apparatus is installed thereby reducing exposure of the workmen to harmful radiation. Seal support segments are installed around the inner shell at the lower end of the space and in engagement with the inner and outer shells. A pair of inflatable tubes are placed end-to-end on the support segments so as to encircle the inner shell. Seal retention segments which, together, form a ring around the inner shell are placed on the inflatable tubes and the latter tubes are inflated to form a water tight seal between the shells. The water level in the shells can be lowered to a level below the inflatable tubes during installation of the components and the water level within the inner shell can be raised so as to immerse the radiation emitting tubes after inflation of the inflatable tubes, but preferably, the radiation emitting tubes are maintained immersed in water until the components are installed and the inflation of the inflatable tubes, and water in the space is then pumped out.

26 Claims, 10 Drawing Sheets

METHOD AND APPARATUS FOR FLUID
SEALING OF STEAM GENERATOR

FIELD OF THE INVENTION

The invention relates to a method and apparatus for sealing communicating co-axial tubes containing a fluid so that the fluid level in one of the tubes can be higher than the fluid level in the other of the tubes and will permit operations intermediate the tubes without being encumbered by fluid intermediate the tubes. The invention relates particularly to a method and apparatus for permitting repair operations between the inner and outer shells of a steam generator which is supplied with a heated fluid from a nuclear reactor vessel.

BACKGROUND OF THE INVENTION

Known types of steam generators supplied with heated fluid from a nuclear reactor vessel have an outer shell or tube and an inner shell or tube with heat exchanger tubes within the inner shell for circulating the heated fluid within the steam generator. A liquid, such as water, is contained within the shells, which are interconnected for liquid flow, so that the upper level of the liquid is the same both in the inner shell and the outer shell and covers the heat exchanger tubes during operation of the steam generator.

At times, it can be necessary to perform repair operations within the space intermediate the inner and outer shells, e.g. repair of the girth weld in the outer shell which is adjacent the upper level of at least one of said heat exchanger tubes.

It would appear to be a simple matter merely to suspend operation of the steam generator and the reactor and lower the fluid water level in the generator to permit such repairs, but radiation is still omitted from inside the inner shell to which workmen in the space between the inner and outer shells are exposed which is undesirable. In the past, under such conditions, lead sheathing has been applied to the outer surface of the inner shell to reduce such exposure. However, the application of such sheathing is time consuming, resulting in high radiation exposure of the workmen, and is not as effective as keeping the tubes immersed in water within the inner shell.

Since the spaces within the shells are interconnected for water flow, the water level between the shells ordinarily would be the same as the water level within the inner shell so that merely raising, or permitting, the water level within the inner shell to be high enough to provide the desired shielding would be unsatisfactory because the areas on which repairs are to be performed would be immersed in the water.

The problem then arises as to how to maintain a water upper level between the shells which is low enough to permit such repairs while permitting a water level within the inner shell which is higher than the water level between the shells and which will cause said heat exchanger tubes to be immersed.

With steam generators of the type which have been installed in pressurized water, reactor power plants, the steam generator cannot, as a practical matter, be opened up to provide easy access to the space between the shells where repairs are to be made. Access to such space is normally limited to relatively small access openings in the outer shell which are above such space.

SUMMARY OF THE INVENTION

In accordance with the preferred embodiment of the invention, the water level within the inner shell, and hence, in the space between the inner and outer shell, is adjusted so that the water covers said heat exchanger tubes within the inner shell, yet is at a small distance below the area where the repairs are to be made so that during the installation steps described hereinafter, which can be accomplished within a relatively short time, the workers are protected by the water within the inner shell as well as the water in the space between the shells. In this case, desirably, the workmen wear wet suits because the subsequent steps require that parts of the bodies of the workmen be immersed in the water between the inner and outer shells. However, if desired, with less safety, the water level in the inner shell may be temporarily reduced below the installation positions for the equipment hereinafter described, and after such equipment is installed, the water level within the inner shell can be raised to a level at which the heated fluid tubes within the inner shell are totally immersed in water.

In the area of concern, the outer shell and the lower part of the inner shell usually have the shape of truncated cones with the lower ends having the smaller diameter. At its upper part, the inner shell can have the shape of a cylindrical annulus. Thus, the shells are nearer each other at the lower ends of the truncated cones. A resilient, flexible tube of a diameter which will fill the space between the inner and outer shells at the lower ends of the truncated cones is inserted between the inner and outer shells to provide a support for workmen and to restrain debris and dropped tools.

Thereafter, a plurality of arcuate, metal, seal support sections of a size which can be passed through the access openings in the outer shell are inserted between the shells above the flexible tube and below the level where the workmen will stand while making repairs and are clamped against the surfaces of the inner and outer shells to provide a seal support deck encircling the inner shell.

Then, two sections of uninflated, but inflatable tubing, the combined length of the sections being substantially equal to the peripheral size of the inner shell, are passed through an access opening and applied over the seal support sections with flexible sealing blocks between the adjacent ends thereof.

After the inflatable sealing tubes are installed, a plurality of arcuate, metal, seal retention sections which can be passed through said access openings are installed over the sealing tubes, clamped together and, by means of jack screws engaging the outer surface of the inner shell, positioned within the space between the shells to provide a ring of sections encircling the inner shell.

The inflatable tube sections are then inflated, e.g. by air under pressure, to provide a water-tight seal between the inner and outer shells.

Preferably, after the tube sections are inflated, but optionally, before they are inflated, a plurality of arcuate metal sections which can pass through an access opening are applied on top of the seal retention sections to provide a work platform encircling the inner shell on which workmen can stand during the making of repairs.

If water is between the shells and above the work platform after the steps described, preferably, such water is pumped out from between the shells so that the space between the shells and above the work platform is free of water. However, because of the seal provided by the sealing tube sections, the water level within the inner shell will not be lowered by the pumping operation.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENTS

Although the process and apparatus of the invention are useful for other purposes, the process and apparatus of the invention have been developed for use in the maintenance and repair of steam generators in nuclear energy plants where it is desirable to shield workmen from nuclear radiation during such maintenance and repair and to permit any apparatus for such purpose to be installed relatively rapidly. Accordingly, the method and apparatus will be described in connection with such a steam generator and from such description, it will be apparent to those skilled in the art how the method and apparatus can be used with equipment other than conventional steam generators.

Figure 1:
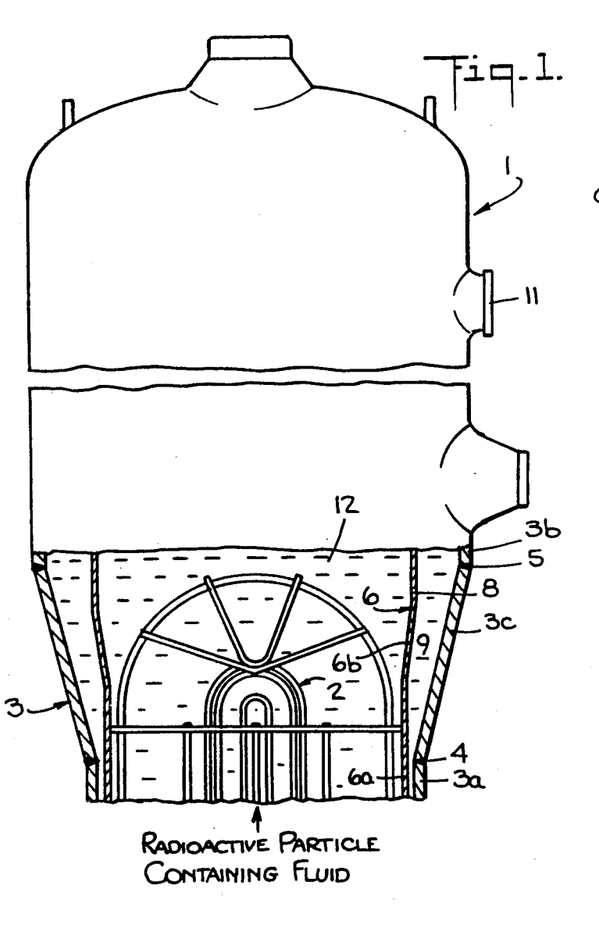
FIG. 1 is a fragmentary, elevation view, partly in cross-section, of a steam generator to which the method and apparatus of the invention is applicable.
Figure 2:
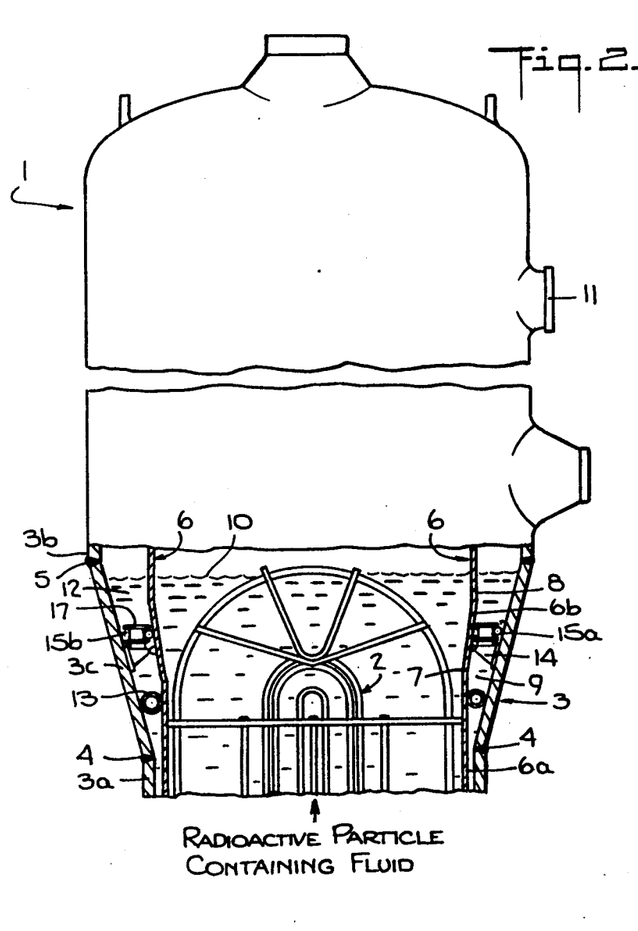
FIG. 2 is similar to FIG. 1 and illustrates the apparatus of the invention installed.

FIGS. 1 and 2 illustrate the relevant parts of a conventional steam generator 1 frequently used in a nuclear energy, electrical power generating plant, FIG. 2 illustrating such steam generator with the apparatus of the preferred embodiment of the invention installed therein. The steam generator can, for example, have a height of about sixty feet and an upper diameter of about fifteen feet and is supplied with water 12 to a level above the heat exchanger tubes 2 only a few of which are shown in FIGS. 1 and 2, to which heated fluid is supplied from a nuclear reactor vessel (not shown). The number of such tubes can, for example, be at least 3200 in number.

The heated fluid supplied to the tubes 2 transports radioactive particles, and during the operation of the steam generator 1, the tubes 2 become coated with a scale layer of these radioactive particles. Therefore, even if the fluid were removed from the tubes when it is desired to perform maintenance or repair within the steam generator, workmen are subject to radiation exposure.

Since steam is generated at relatively high pressure, the steam generator 1 has a relatively thick tubular outer shell 3 which has a smaller diameter lower portion 3a, a larger diameter upper portion 3b and a liquid impenetrable conical transition portion 3c. The conical portion 3c is welded at its lower and upper ends to the lower portion 3a and the upper portion 3b by weldments 4 and 5, respectively, known as "girth" welds.

The heat exchanger tubes 2 are encircled by a tubular inner shell 6 which has a lower portion 6a and a liquid impenetrable, conical upper portion 6b, the upper ends of the tubes 2 being within the upper portion 6b of the inner shell 6. The inner shell 6 is spaced from the outer shell 3 throughout its length, and water can enter between the shells 3 and 6 at the lower end of the shell 6. Therefore, normally, the upper water level within the shell 6 is the same as the water level within the shell 3, and during operation the upper water level can be about seven feet above the upper girth weld 5. When the steam generator 1 is shut-down for maintenance, the upper water level remains the same unless action is taken to remove water from the steam generator 1.

The outer surface of the lower portion 6a below the lower end 7 of the upper portion 6b can be spaced from the inner surface of the outer shell 3 by approximately six inches or less and the outer surface of the upper end 8 of the upper portion can be spaced from the inner surface of the outer shell by approximately twelve inches, thereby providing sufficient space 9 between the conical inner shell portion 6b and the conical transition portion 3c for entry of the legs and arms of a workman.

At times, it becomes necessary to repair the upper girth weld 5 from inside the shell 3. This usually means that the upper level of the water within the shell 3 must be lowered below the girth weld 5, such as by partially draining water from the shell 3. The water could be removed until the upper level thereof is at the lower end 7 of the inner shell portion 6b, but in this case, workmen in the space 9 would be subjected to the radiation from the upper portions of the heat exchanger tubes 2. While workmen in the space 9 can be subjected to such radiation for a relatively short time, i.e., the relatively short time required for installation of the apparatus of the invention, the workmen should not be subjected to such radiation for the relatively long time required for repairs. Therefore, while the upper water level can be lowered to, or a small distance below, the lower end 7 of the inner shell portion 6b for the length of time required to install the apparatus of the invention, water, which is an effective radiation shield, should be added within the shell 3, after the apparatus of the invention is installed, until the upper ends of the heat exchanger tubes 2 are immersed in water, the apparatus of the invention preventing water from entering the space 9 as described hereinafter.

However, it is preferred that instead of lowering the water until its upper level is at, or a small amount below, the lower end 7, the water is removed from the shell 3 only until it is at, or a short distance, e.g. six inches, below the girth weld 5, e.g. at the level indicated by the reference numeral 10 in FIG. 2, before the apparatus of the invention is installed. In this way, even though the apparatus of the invention must be installed under water, the workmen will be shielded by water with respect to radiation from the heat exchanger tubes 2 during the installation of the apparatus of the invention. It will be noted that with the water at the level 10, the heat exchanger tubes 2 are totally immersed in water.

While access to the interior of the upper shell portion 3b is provided by way of one or more access openings 11 in the upper shell portion 3b, such openings 11 are relatively small, e.g. about sixteen inches in diameter. Also, within the upper shell portion 3b, vertical ladders are used to permit movement of workmen to various interior parts of the steam generator 1. However, the maneuvering space is small, and this, combined with the small size of the access openings, makes it necessary that any parts to be installed for the purposes of the invention have relatively small dimensions.

In order better to understand the invention, a general description thereof will first be given, and thereafter, the details of the parts thereof will be described. With reference to FIG. 2, the water level in the outer shell 3, and hence, in the inner shell 6 which is in water communication with the outer shell 3, is lowered, preferably, to the level 10 by removal of water from the shell 3, e.g. by drawing or pumping the water out of the shell 3 until the water 12 has an upper level 10. However, the water 12 may, as described hereinbefore, be removed until its upper level is adjacent the lower end 7 of the inner shell portion 6b.

Thereafter, a flexible tube 13 which can withstand the weight of a workman without flattening, e.g. a thin-walled steel or fabric reinforced tube, of a linear length substantially equal to the circumference adjacent the lower end 7 of the shell portion 6b and of a diameter at least equal to the distance between the outer surface of the shell 6 adjacent the lower end 7 and the inner surface of the shell portion 3c is passed through an access opening 11, and delivered to the space 9 where it is wedged between the inner shell 6 and the outer shell 3. Although not entirely necessary, the tube 13 is useful in aiding a workman to stand in the space 9 during subsequent operation and in preventing tools and other material from falling between the lower shell portions 3a and 6a during the subsequent installation of other parts.

Thereafter, a plurality of arcuate seal support sections 14 are passed through an access opening 11 and are secured in position between the outer surface of the inner shell portion 6b and the outer shell portion 3c and a pair of inflatable, but uninflated, double section tube assemblies 15a and 15b are passed through an access opening 11 and positioned on the seal support sections 14. The combined lengths of the inflatable tubes is substantially equal to the circumference of the inner shell portion 6b at the level of the top of the installed seal support sections 14. If the level of the top of the seal support sections 14 is below the water 12, it may be necessary to evacuate air from the tube assemblies 15a and 15b to prevent flotation thereof. Also, sealing filler blocks, described hereinafter, are placed between the adjacent ends of the inflatable tube assemblies 15a and 15b.

Thereafter, a plurality of arcuate seal retention sections 16 are passed through an access opening 11, positioned on top of the inflatable tube assemblies 15a and 15b and clamped together. The function of the seal retention sections 16 is to retain the tube assemblies 15a and 15b in sealing positions when they are inflated, and preferably, the sections 16 are provided with jack screws engageable with the outer surface of the upper shell portion 6b to position them and hold them in place.

While the work platform sections, or section 17 can now be installed before the sealing tube assemblies 15a and 15b are inflated, preferably, before the work platform sections, or section, 17 are installed, the sealing tube assemblies 15a and 15b are inflated to test the effectiveness of the water seal. Thus, if the water 12 has been at the level 10, the sealing tube assemblies 15a and 15b are inflated, and the water 12 above such inflated tube assemblies 15a and 15b is pumped out. If any leakage by the tube assemblies 15a and 15b is observed, the pressure in the tube assemblies 15a and 15b is increased to stop the leakage.

If the water level has been adjacent the lower end 7 of the portion 6b during the steps of applying the seal support sections 14, the sealing tube assemblies 15a and 15b and the seal retention sections 16, the water level within the inner shell 6 is raised to at least the upper ends of the heat exchanger tubes 2 after the sealing tube assemblies 15a and 15b are inflated. If there is any leakage by the tube assemblies 15a and 15b, the pressure therein is increased as aforesaid.

It is not necessary that a plurality of arcuate work platform sections 17 be employed, each section being capable of being passed through an access opening 11 and transported to the position shown in FIG. 2, because only one section movable from one circumferential position to another can be sufficient. However, it is preferred that a plurality of such sections 17 be mounted and rest on the seal retention sections 16 so as to provide a work platform encircling the shell portion 6b. The arcuate work platform sections 17 are installed as described, and the space above the sealing tube asssemblies 15a and 15b is free of water permitting easy access to the girth weld 5. However, the workmen on the work platform are shielded with respect to radiation from the heat exchanger tubes 2 by reason of the fact that such tubes 2 are immersed in water. It will also be observed that with the invention, it is unnecessary to remove the radioactive fluid from the heat exchanger tubes 2.

Figure 3:
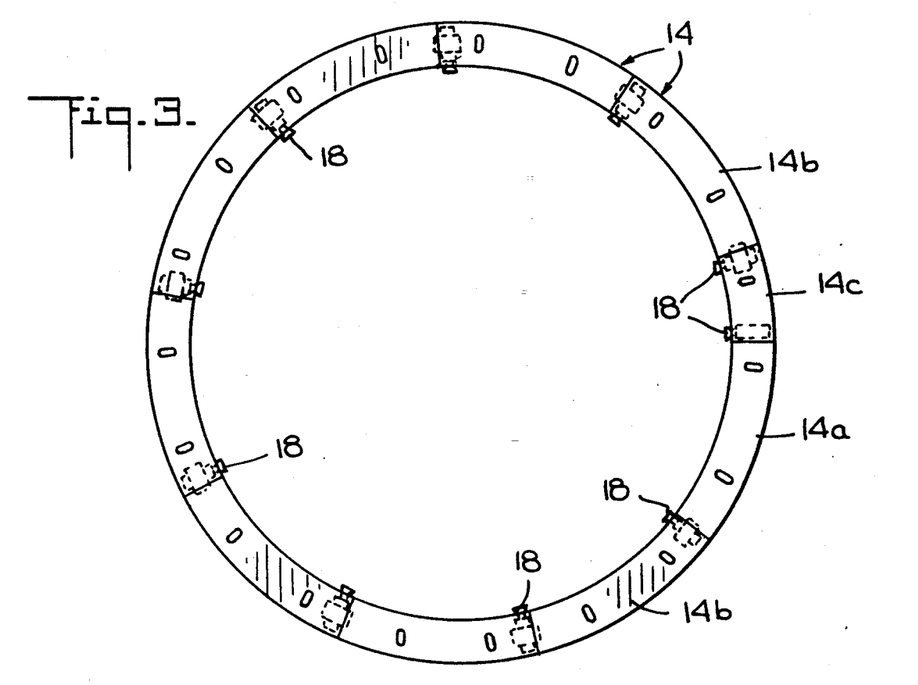
FIG. 3 is a diagrammatic, top view of the seal support deck forming part of the preferred embodiment of the apparatus of the invention.

FIG. 3 is a plan or top view of the deck or ring formed by the arcuate seal support sections 14, all of which, with minor exceptions, are identical. The sections 14 are illustrated in greater detail in FIGS. 7 and 9-14. The inner and outer diameters of the deck or ring, and hence, the radii of the arcs of the sections 14, are selected so that the ring will fit in the space 9 with a relatively small clearance at the level at which the sections 14 are to be installed. For example, the outer surface of the upper shell portion 6b at the level where the sections are to be installed can have a diameter of about ten feet and the inner surface of the outer shell transitional portion 3c at the same level can have a diameter of close to twelve feet. The seal support ring can comprise more or less than the ten sections 14 shown in FIG. 3, but for ease in handling, ten sections is convenient.

The section 14a differs from the other sections 14 in that, since it is the first section installed, it has two jack screws 18 for engagement with the outer surface of the inner shell upper portion 6b. Such jack screws 18 on the section 14a are used to secure the section 14a at the proper level, as described hereinafter, the section 14a supporting one end of the next installed section 14b and one end of the last section 14c. The section 14b is supported at its opposite end by a jack screw 18, and the section 14c is supported at each end by the next adjacent sections 14a and 14b and, therefore, does not need a jack screw 18. Section 14c, without a jack screw 18, is initially made in a circumferential length greater than the theoretical circumferential length required to complete the seal support ring so that it may be cut to the required length after the other sections have been installed.

Figures 7, 8, 10:
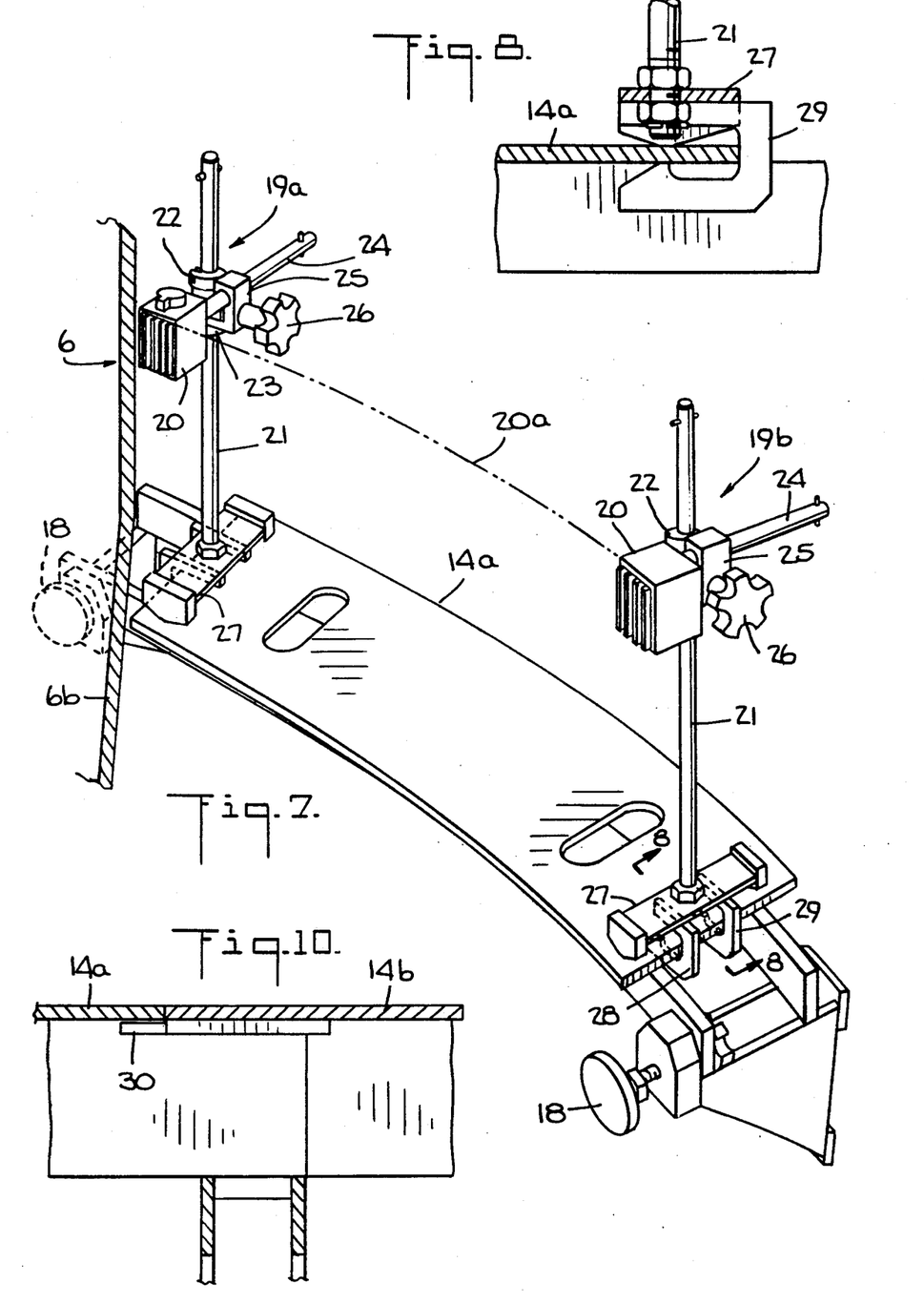
FIG. 7 is an enlarged, fragmentary, perspective view illustrating the use of a seal support deck tool in the installation of a segment of the seal support deck.
FIG. 8 is a fragmentary, sectional view taken along the line 8—8 in FIG. 7.
FIG. 10 is an enlarged, fragmentary cross-sectional view of a portion of the seal support deck shown in FIG. 9.

After lowering the water 12 to the desired level, e.g. the level 10, and prior to the installation of the seal support sections or segments 14, the flexible tube 13 is pressed into place, as shown in FIG. 2, to provide a support for workmen. Thereafter, a dimensional evaluation of the shell portions 6b and 3c is performed to determine the most effective vertical position for the inflatable tube assemblies 15a and 15b. After such evaluation, a line, e.g. the dash-dot line 20a shown in FIG. 7, is marked on the outer surface of the inner shell portion 6b at a level corresponding approximately to the level where the maintenance or repair is to be performed, e.g. the level of the girth weld 5. In general, the inner shell 6 is made of magnetic material, and such line is located so that the magnet of the preferred tool described hereinafter will magnetically grip the inner shell 6.

Although other tools can be used for properly locating the seal support sections 14 vertically, two tools 19a and 19b have been found to be convenient and to permit rapid installation of the sections 14. Each tool 19a and 19b comprises a magnet 20 which is adjustable in the vertical direction on a rod 21, and which is held in the selected position on the rod 21 by collars 22 and 23 with set screws. The magnet 20 is mounted by a rod 24 which is movable toward and away from the shell 6 and which is held in the selection position by means of a clamp 25 operable by a knob 26.

The rod 21 is connected in a conventional manner to a holder 27 which has a pair of U-shaped portions 28 and 29 for receiving an end portion of a seal support section 14. The distance between the top of the magnet 20 and the top of the holder 27 preferably is selected to be about twenty-eight inches minus the distance of the level line 20a from the level of the girth weld 5, if the line 20a is below the level of the girth weld 5, or plus the distance of the level line 20a from the level of the girth weld 5 if the line 20a is above the level of the girth weld 5.

Both tools 19a and 19b are used only for the installation of the first section 14a. Thus, as shown in FIG. 7, the section 14a is suspended from the tools 19a and 19b with the top of the magnets 20 at the level line 20a. Then, the two jack screws 18 are tightened so that the section 14a is supported by the inner shell portion 6a and the outer shell portion 3c in a manner which will permit a workman to stand on the section or segment 14a without causing movement of the section 14a.

Figure 11:
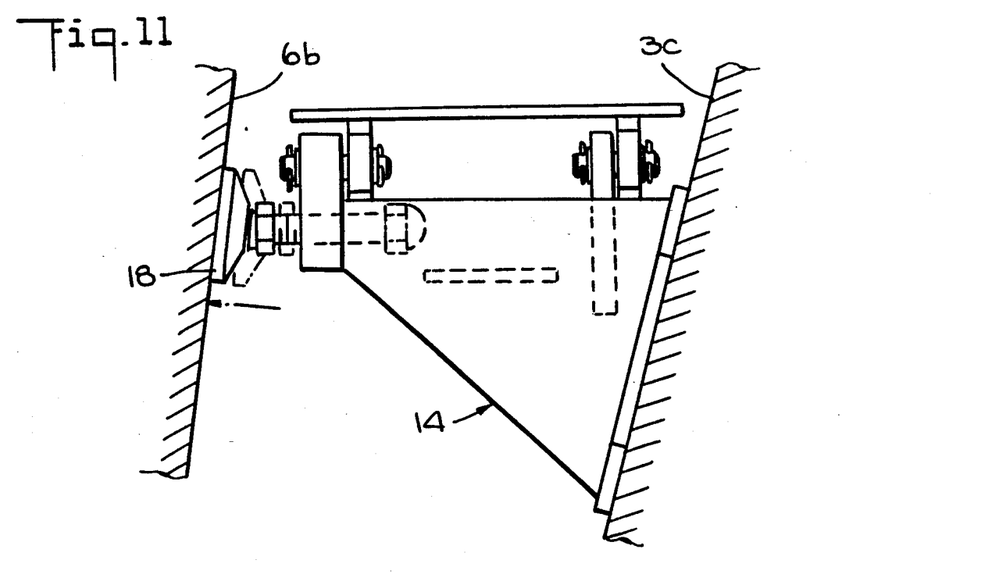
FIG. 11 is an enlarged, side elevation view, partly in cross-section, of a portion of the seal support deck.

Thereafter, the tools 19a and 19b are removed and the end of the section or segment 14b having the tongue 30 is engaged with one end of the section 14a, and the other end of the section 14b is supported by a tool 19a or 19b, as described in connection with one end of the section 14a, until the jack screw 18 thereon is tightened. FIG. 11 is an end view of an installed section 14a or 14b. The process is repeated for the remaining sections or segments 14b until the section or segment 14c is reached. At this point, the section 14c, cut to the appropriate length, is added and is supported at one end by the previously installed segment 14b and at the opposite end, by the segment 14a. Accordingly, a seal support deck or ring of sections 14 is provided, and such deck or ring will support the weight of at least one workman.

Next, a plurality, and preferably, a pair, of closed-end, resilient, inflatable tube assemblies 15a and 15b (see FIGS. 4, 9 and 12-14) are applied over the support deck or ring formed by the sections 14. The combined length of the uninflated tube assemblies 15a and 15b is substantially equal to the circumference of the inner shell portion 6b at the level of the support deck. Each assembly (see FIGS. 12-14) includes an air-tight tube 31 interconnected by a membrane 32. The tube 31 and the membrane 32 can, for example, be made of ethylene propylene diene monomer (EPDM) with the membrane 32 vulcanized to the tube 31. Preferably, the outer faces of the tubes 31 have a layer 33 of sponge rubber bonded thereto to enhance sealing. The tubes 31 are inflatable with air by hoses (not shown) secured to the stems (see FIGS. 4 and 12-14). If the assemblies 15a and 15b are to be installed under water, flotation of the assemblies can be avoided by evacuating air from within the tubes 31 by way of the stems 34.

Figure 4:
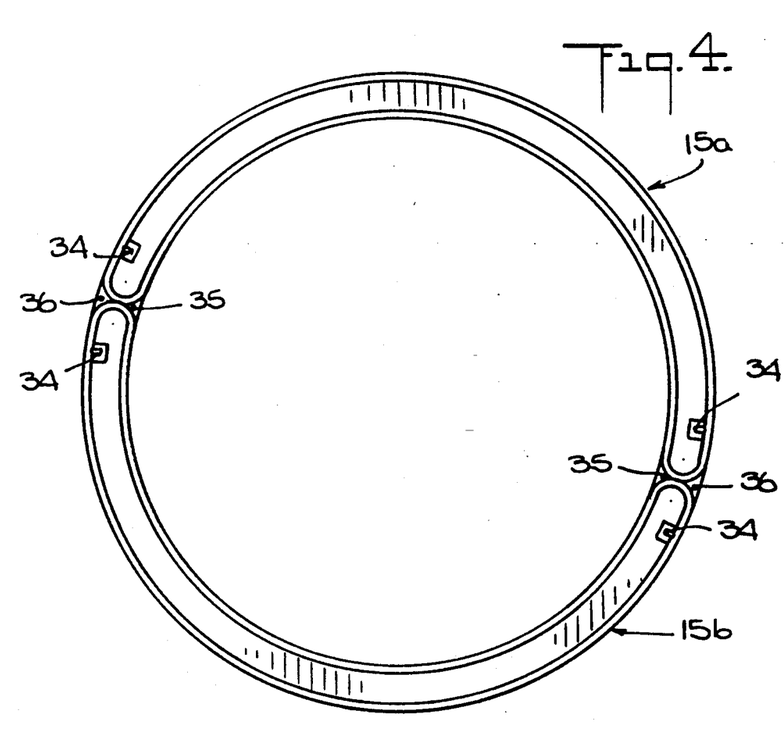
FIG. 4 is a top view of the inflatable seal forming part of the preferred embodiment of the apparatus of the invention.
Figure 9:
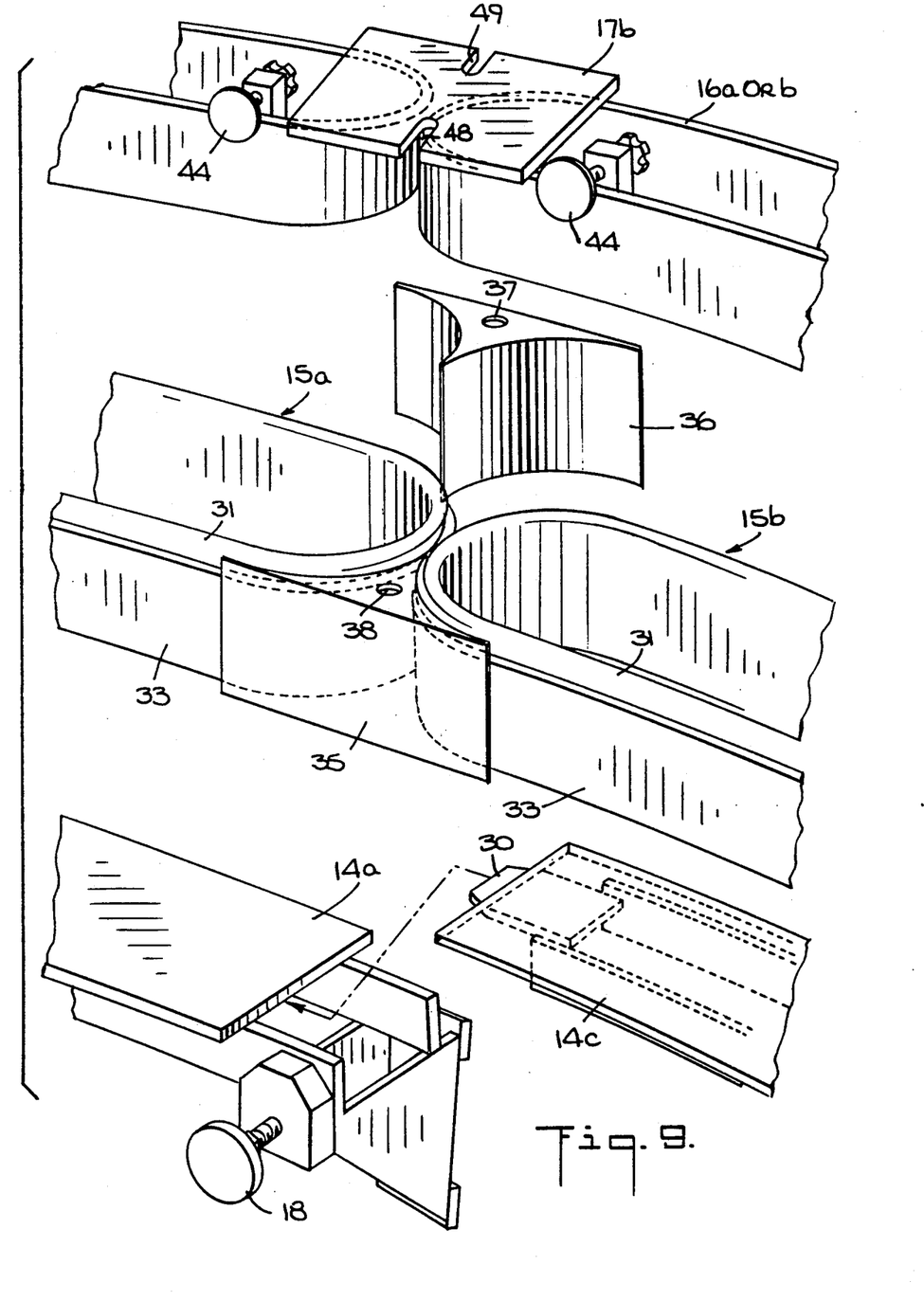
FIG. 9 is an exploded, fragmentary, enlarged perspective view of adjoining ends of segments of the seal support deck, the inflatable seal and the seal support ring.

In order to provide seals at the adjacent ends of the tube assemblies 15a and 15b, pairs of resilient filler blocks 35 and 36, which also can be made of EPDM, are inserted between such ends as shown in FIGS. 4 and 9. Although they may not be necessary, the blocks 35 and 36 can have holes 37 and 38 for receiving conventional expanders, e.g. pipe expanders, to expand the filler blocks 35 and 36 against the surfaces of the shell portions 6b and 3c.

Figure 12:
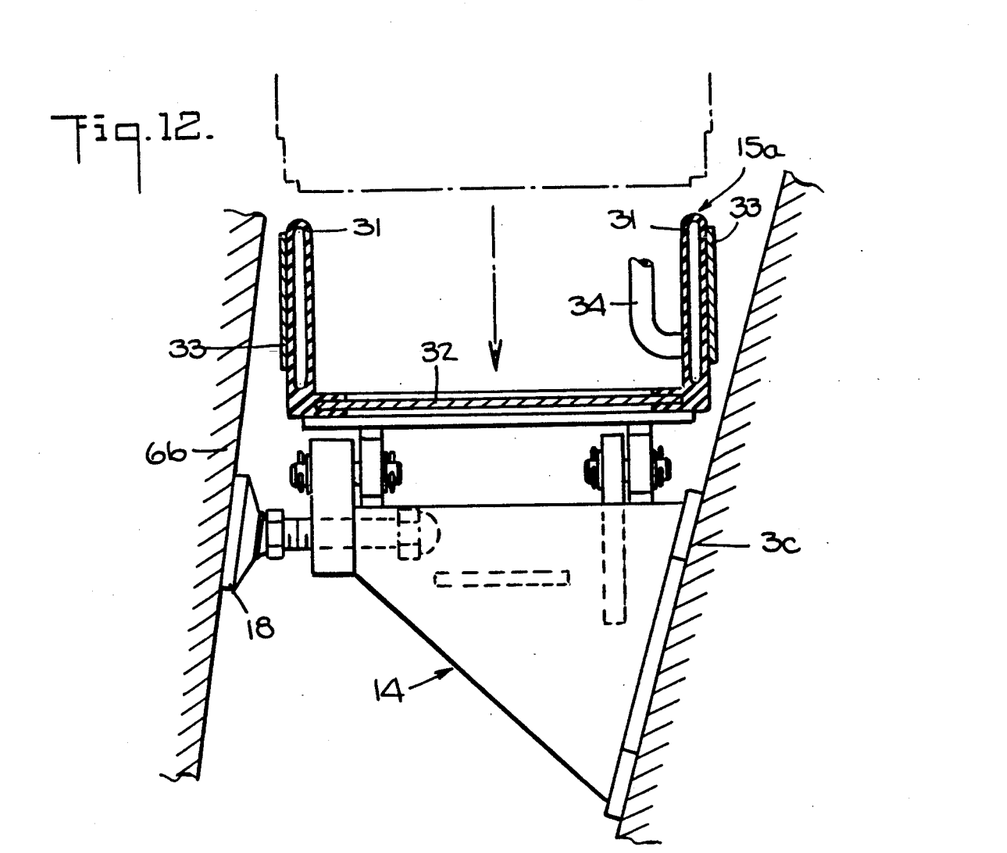
FIG. 12 is similar to FIG. 11 with the addition of the inflatable seal.
Figure 13:
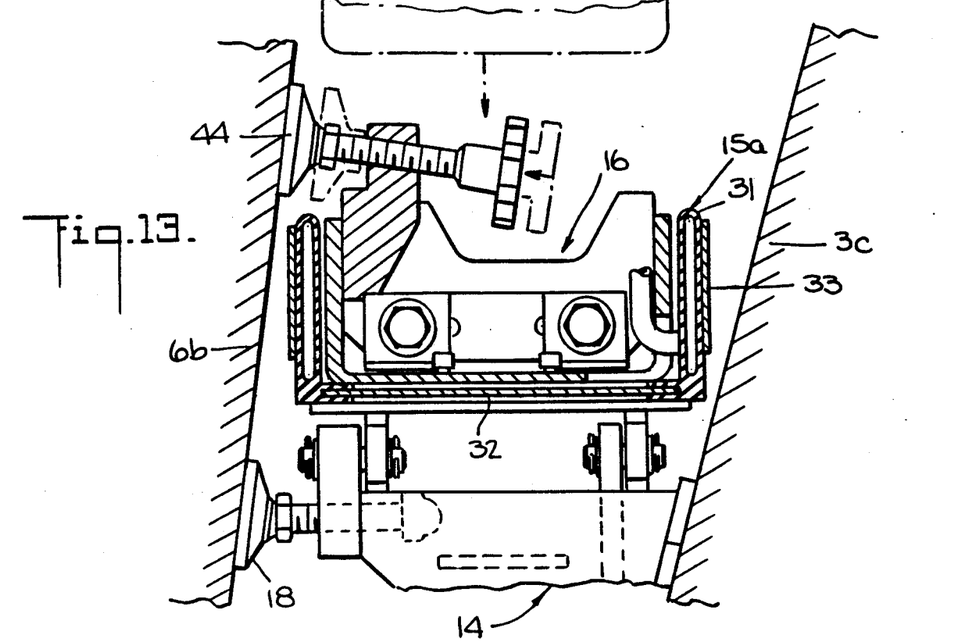
FIG. 13 is similar to FIG. 12 with the addition of the seal support ring.

FIG. 12 shows, in cross-section, the parts which have been assembled thus far in the description of the invention, and FIG. 13 illustrates the next step in which the seal retention sections or segments 16 are inserted on top of the membrane 32 before the tube assemblies 15a and 15b are inflated to retain the tube assemblies 15a and 15b in their sealing positions as the tubes 31 are inflated.

Figure 5:
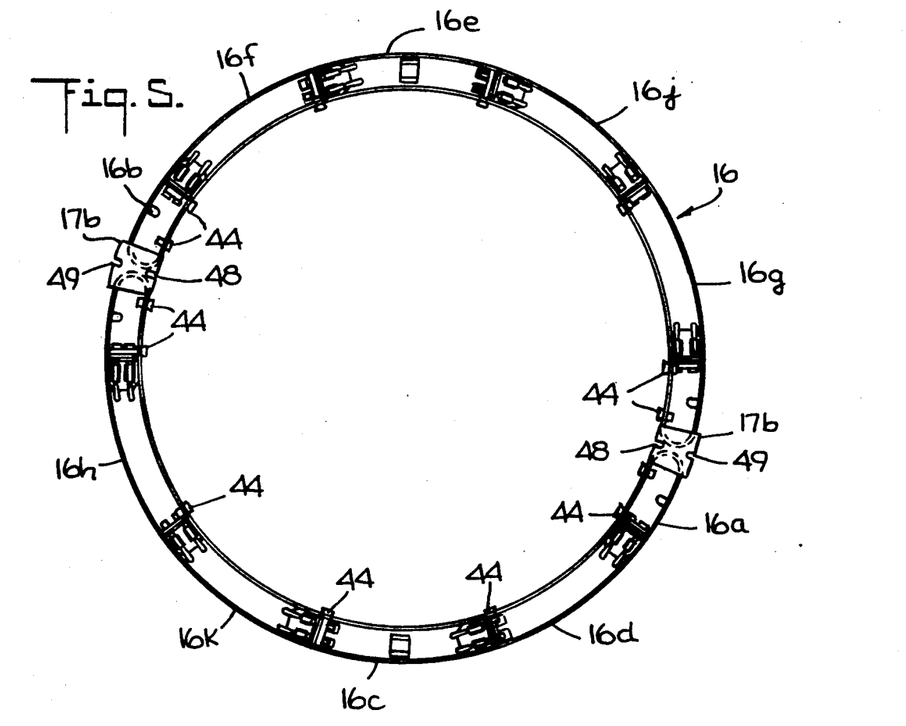
FIG. 5 is a diagrammatic, top view of the seal support ring forming part of the preferred embodiment of the apparatus of the invention.

Although, as indicated in FIG. 5, it is convenient to use ten sections or segments 16 to form a seal retention ring, the number of segments 16 can be more or less. The segments 16 are all similar but because of the need to fit between the tubes 31, it is convenient to provide segments which are not all identical.

Thus, segments 16a and 16b can be identical. The segment 16a has two parts welded to a plate 17b and the segment 16b has two parts welded to another similar plate 17b. Each of the segments 16c, 16d, 16e and 16f can be identical, and the segments 16g and 16h can be identical. Segments 16j and 16k are identical but as compared to the other segments, have four, rather than two, handle actuated clamping levers.

Figure 15:
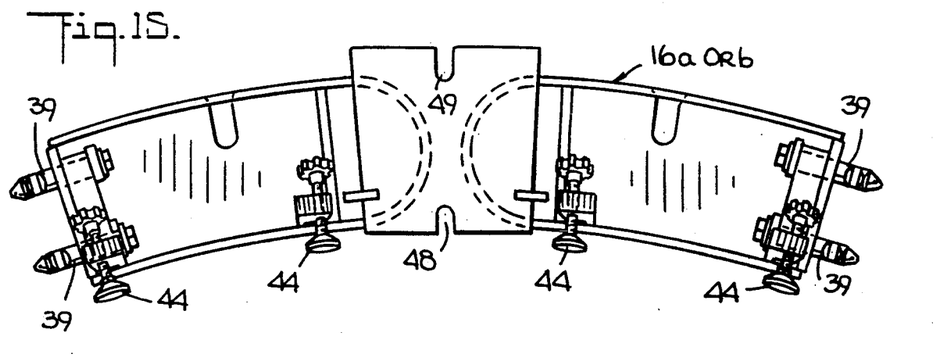
FIGS. 15-18 are enlarged top views of segments of the seal support ring.
Figure 16:
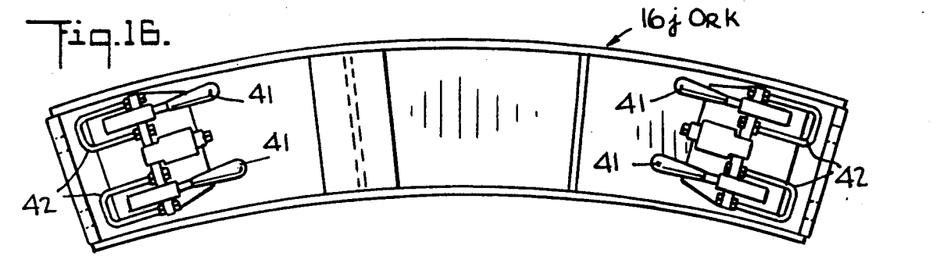
Figure 17:
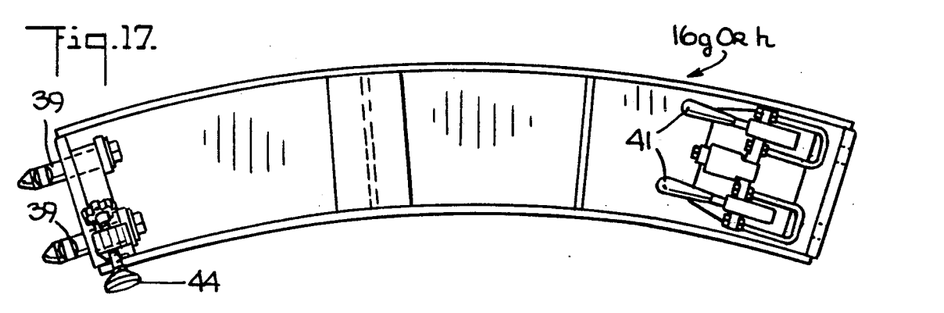
Figure 18:
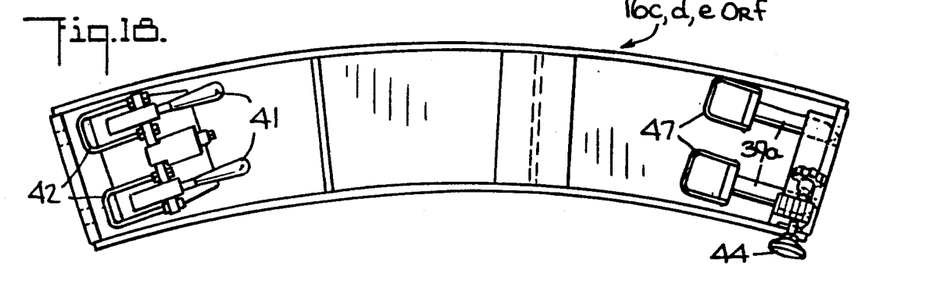
Figure 19:
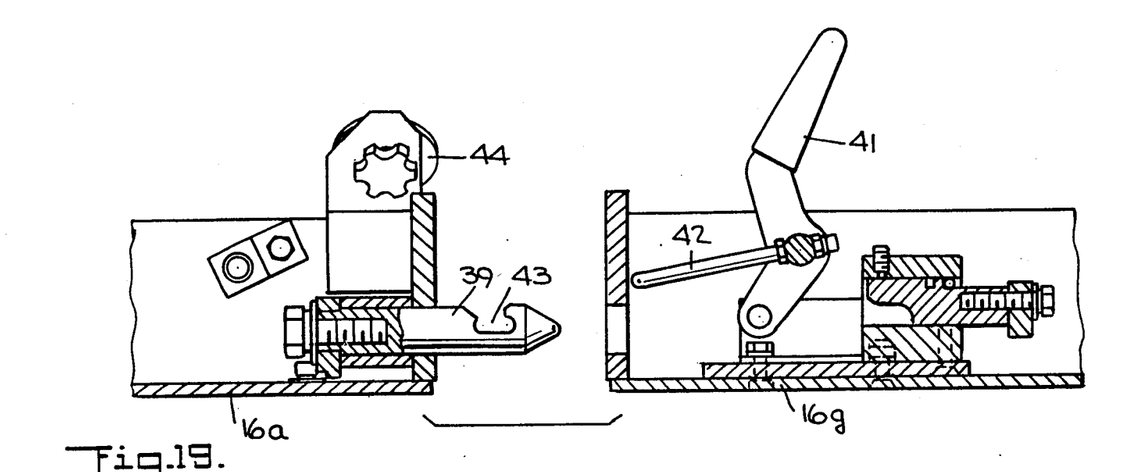
FIG. 19 is a fragmentary, enlarged, side elevation view, partly in cross-section, of segments of the seal support ring and the clamps therefor.
Figure 20:
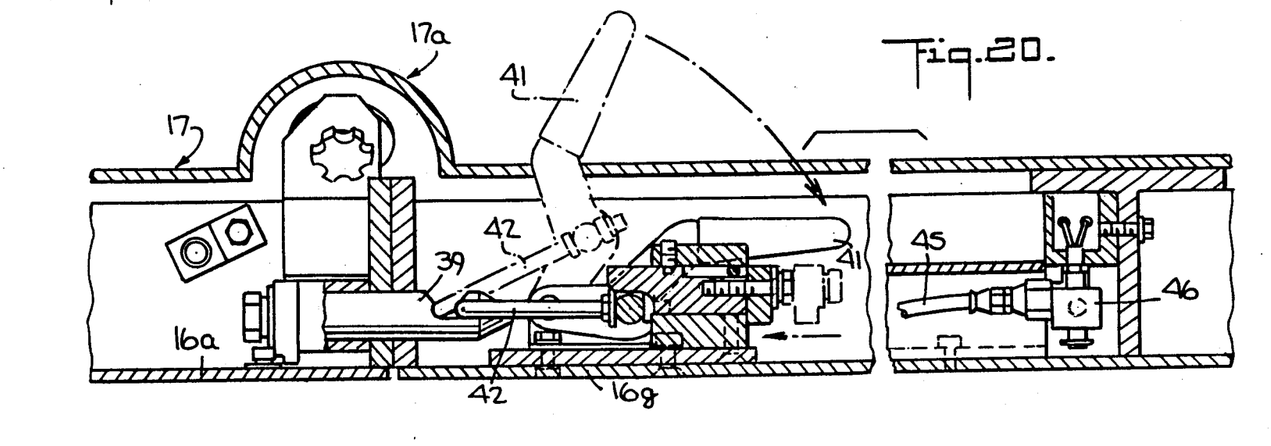
FIG. 20 is similar to FIG. 19 with the addition of a segment of the work platform and with a pair of seal support ring segments clamped together.
Figure 21:
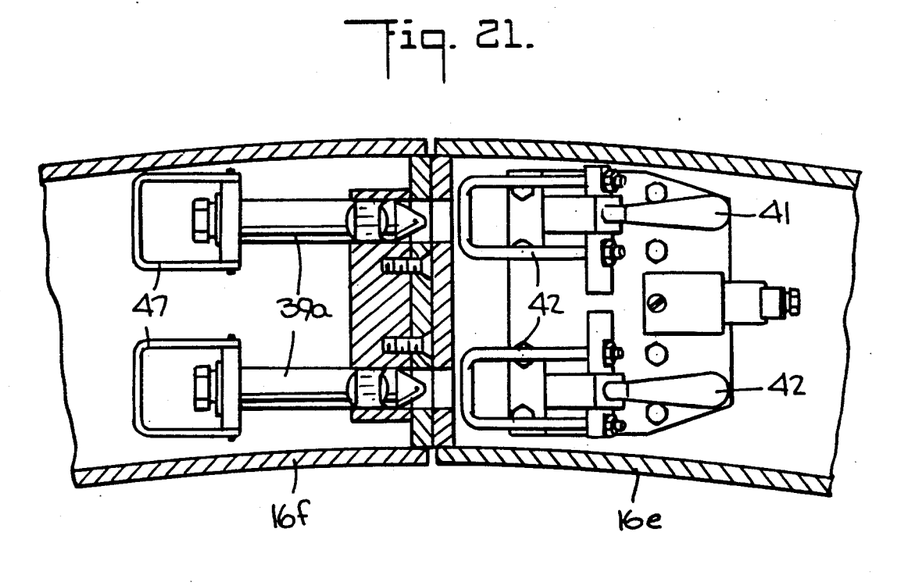
FIGS. 21 and 22 are enlarged, fragmentary, top views illustrating the clamping together of a pair of seal support ring segments.
Figure 22:
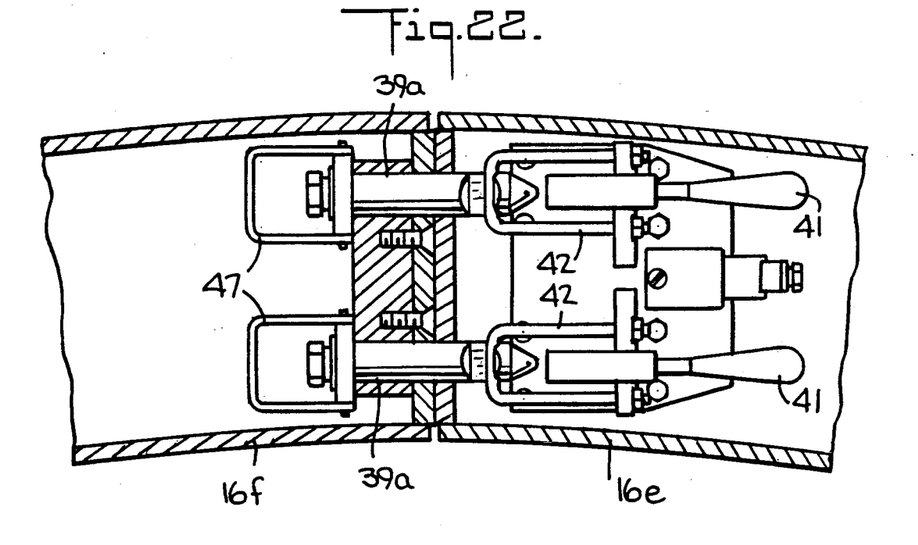

FIG. 15 illustrates the segment 16a, and hence, the segment 16b, in greater detail, FIG. 16 illustrates the segments 16j and 16k in greater detail, FIG. 17 illustrates the segments 16g and 16h in greater detail and FIG. 18 illustrates the segments 16c–16f in greater detail. FIGS. 19–20 illustrate the clamping mechanism for the segments 16a and 16g, and FIGS. 21 and 22 illustrate similar clamping mechanisms for the other segments 16.

Referring first to FIGS. 19 and 20, the segment 16a has a pair of notched retaining pins 39 extending from the end thereof adjacent to the segment 16g. The pins 39 fit through openings 40 in the adjacent end of the segment 16g. The segment 16g has a lever or handle 41 pivotally mounted thereon and has an adjustable bail or loop 42 pivotally mounted on the handle 41. The handle 41 is shown in its raised position in FIG. 19 and in its lowered position in FIG. 20. The pivot axes of the handle 41 and the loop 42 are selected so as to provide an "over-center" action whereby when the loop 42 is in the notch 43 and the handle 41 is moved to the position shown in FIG. 20, the segment 16a is pressed against the segment 16g and the segments are locked together until the handle 41 is lifted.

The segments 16a and 16b also have four manually rotatable jack screws 44 and at least six of the other segments 16 have a single jack screw 44 for engagement with the outer surface of the inner shell portion 6b, (see FIGS. 5, 9, 19 and 20) to position the segments between the portion 6b and the inner surface of the outer shell portion 3c and to restrict upward movement of the segments 16 when the tubes 31 are inflated.

As indicated in FIG. 20, one or more of the segments 16 can have a sump pump hose 45 and a level switch 46 attached thereto for pumping water out of the space adjacent thereto.

The segments 16 are clamped together in the manner described in connection with FIGS. 19 and 20. FIGS. 21 and 22 illustrate the clamping together of segments 16f and 16e, and the remaining segments are similarly clamped together. The pins 39a shown in FIGS. 21 and 22 correspond to the pins 39 shown in FIGS. 19 and 20 but are provided with bails 47 so that they may be easily retracted prior to placing the segments into their relative positions.

After the seal retention sections or segments 16 are installed to form a ring and all jack screws 44 are tightened, it is preferable to inflate the tubes 31, e.g. to a pressure of about 10 psig, by way of the stems 34 and to lower the water in the space 9 by pumping it out of such space 9 until the water level in such space is at least down to the level of the tubes 31 to determine if there is any water leakage past the tubes 31 and the filler blocks 35 and 36. If expansion tools were used in the filler blocks 35 and 36 such tools are removed. If there is leakage past the tubes 31, the pressure therein can be increased until it stops.

If the space 9 was empty of water during the steps of installing the seal support sections 14, the tube assemblies 15a and 15b and the seal retention sections 16, the tubes 31 are inflated and water is supplied to the inside of the inner shell 6 until the water level is substantially at the level 10. Leakage is checked and overcome as set forth hereinbefore.

Although it is preferred to perform the inflation and the leakage checks before the work platform sections or segments 17 are installed, the work platform segments 17 can be installed thereafter. As indicated hereinbefore, it is preferred that a ring shaped work platform of a plurality of segments 17 be installed, but a single segment 17, or a number of segments 17 less than the ten shown in FIG. 6 can be used. Also, in the case that a full ring work platform is provided, the number of segments 17 could be more or less than ten.

Figure 6:
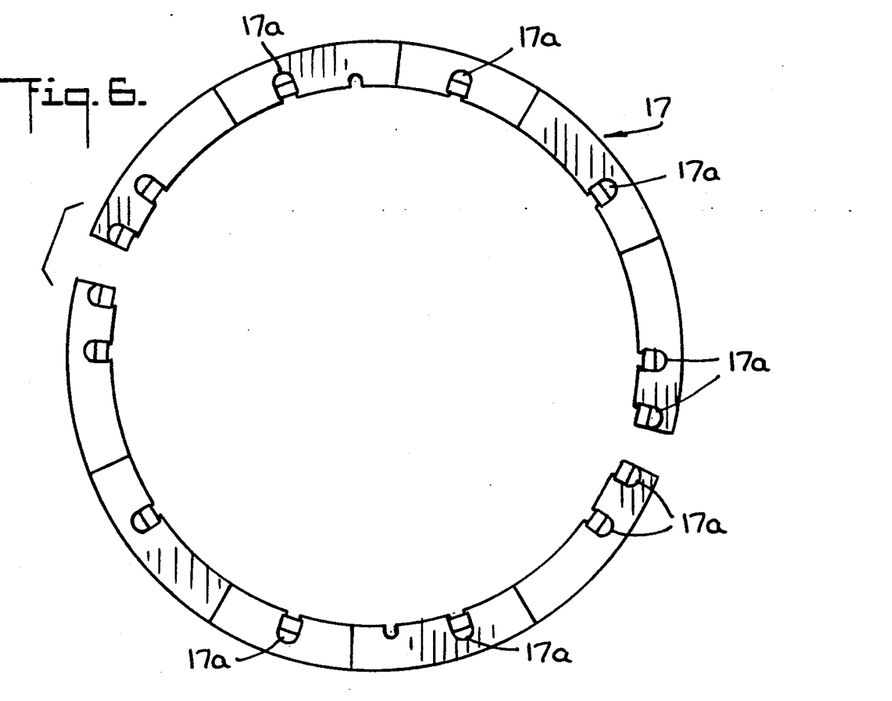
FIG. 6 is a top view of the work platform forming part of the preferred embodiment of the apparatus of the invention.
Figure 14:
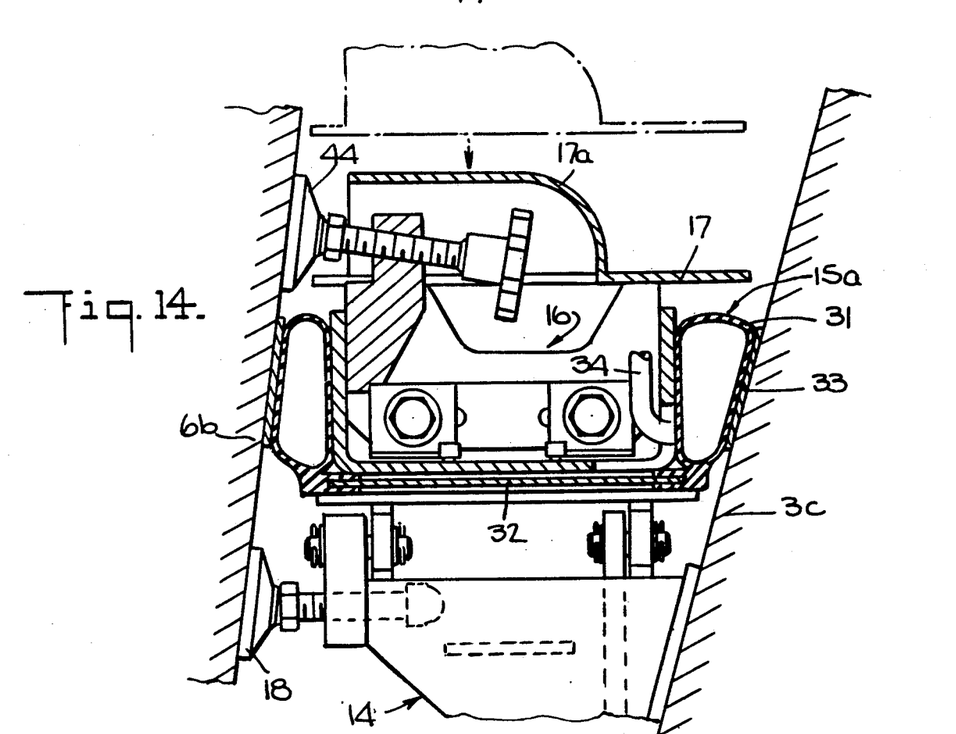
FIG. 14 is similar to FIG. 13 with the addition of the work platform and the inflation of the inflatable seal.

The work platform segments 17 are all substantially the same except for the location of upwardly extending portions 17a for receiving the jack screws 44. Such segments 17 are shown in FIGS. 6, 14 and 20. There are, however, two short segments 17b which are integral with the seal retention ring segments 16a and 16b (see FIGS. 5, 9, 15). The segments 17b overlie the filler blocks 35 and 36 and have slots 48 and 49 (see FIGS. 5, 9 and 15) which are provided in case it is necessary to insert a filler block expansion tool in the holes 37 and 38 in the filler blocks 35 and/or 36. As will be apparent from the drawings, the segments 17 rest on portions of the seal retention segments 16.

The various sections or segments 14, 16 and 17 are made of a material which is resistant to corrosion by water, such as aluminum.

In the various Figures, the hoses for connecting the tubes 31 to an air source, the water pumps, etc. have not been shown since the location thereof is not relevant to the invention and can be readily selected by those skilled in the art. Also, the apparatus exterior to the steam generator for supplying air, pumping, monitoring, etc. have not been shown since such apparatus is well known to those skilled in the art.

For the purpose of expediting the installation of the apparatus of the invention, the various parts are tested for proper operation and fit prior to the commencement of the installation thereof. Also, it is desirable to mark the parts with position numbers prior to commencement of installation so that they are delivered to the installation site and installed in the proper order.

Although preferred embodiments of the present invention have been described and illustrated, it will be apparent to those skilled in the art that various modifications may be made without departing from the principles of the invention.

We claim:

1. The method of reducing exposure of a human within the space between an inner tube co-axial with an outer tube to harmful radiation emitted by a radiation emitting structure within said inner tube, said inner tube having a liquid impenetrable outer surface portion which encircles at least a portion of said radiation emitting structure and said outer tube having a liquid impenetrable inner surface portion facing and coextensive with said outer surface portion and spaced from said outer surface to define said space, said space normally having liquid communication with the interior of said inner tube at one end of said space and said interior of said inner tube containing a liquid which absorbs said radiation and which normally enters into said space, said method comprising:

installing a liquid seal at said one end of said space for preventing the flow of said liquid into said space from said interior of said inner tube, the installation of said liquid seal comprising encircling a circumferential portion of said outer surface portion of said inner tube at sad end of said space with a plurality of inflatable tubes disposed end-to-end in liquid sealing relation and inflating said inflatable tubes until said inflatable tubes engage said outer surface portion and said inner surface portion of said outer tube, said inflatable tubes also being deflatable and removable from between said inner tube and said outer tube and performing one of the following two steps:

(a) during the installation of said liquid seal, maintaining said portion of said radiation emitting structure at least substantially covered by said liquid and maintaining said liquid in said space and thereafter, removing at least a portion of said liquid from said space at the side of said liquid seal opposite from said end of said space; and (b) before the installation of said liquid seal, removing said liquid from said interior of said inner tube until said space is at least partially free of said liquid and thereafter, installing said liquid seal and then adding said liquid to said interior of said inner tube until said radiation emitting structure is at least substantially covered by said liquid.

2. The method as set forth in claim 1 wherein each said inner tube and said outer tube is a shell of a steam generator and said inner tube and said outer tube are co-axial with a vertical axis, said radiation emitting structure is a plurality of tubes which are supplied with heated fluid containing radioactive particles during operation of the steam generator, said liquid is water and said end of said space is the lower end thereof.

3. The method as set forth in claim 1 further comprising providing an inflatable tube-supporting ring below said inflatable tubes before inflation thereof, said supporting ring comprising a plurality of arcuate ring segments encircling and engaging a circumferential portion of said outer surface portion of said inner tube and engaging said inner surface portion of said outer tube.

4. The method as set forth in claim 3 wherein each of said inflatable tubes comprises an outer inflatable portion and an inner inflatable portion secured together by a membrane and said membrane is placed in engagement with the upper surface of said supporting ring.

5. The method as set forth in claim 4 further comprising providing a seal retention ring intermediate said outer inflatable portion and said inner inflatable portion and on top of said membrane prior to inflating said outer inflatable portion and said inner inflatable portion, said seal retention ring comprising a plurality of arcuate retention segments which are placed successively end-to-end on said membrane and which are clamped together by clamping means, said retention segments having adjustable retention means which is moved into engagement with said outer surface portion of said inner shell.

6. The method as set forth in claim 5 wherein said outer surface portion of said inner tube has the shape of a truncated cone with its smaller diameter below the larger diameter.

7. The method as set forth in claim 5 further comprising superimposing a work platform segment on top of said seal retention ring.

8. The method as set forth in claim 5 further comprising superimposing a work platform ring on said seal retention ring by adding a plurality of arcuate work platform segments on top of said seal retention ring.

9. The method as set forth in claim 8 wherein said plurality of arcuate work platform segments are added after inflating said outer inflatable portion and said inner inflatable portion.

10. Apparatus for sealing the space between an inner tube and an outer tube co-axial with a vertical axis with respect to liquid flow into said space, said space being defined by as liquid impenetrable outer surface portion of said inner tube and a liquid impenetrable inner surface portion of said outer tube facing, coextensive with and spaced from said outer surface of said inner tube, said apparatus comprising:

a seal support ring encircling said outer surface portion at a lower portion thereof, said ring comprising a plurality of arcuate support segments in end-to-end relation and a plurality of such arcuate support segments comprising means engaging said outer surface portion and said inner surface portion;

a plurality of inflatable tube assemblies in end-to-end relation, encircling said outer surface portion and disposed on top of said seal support ring; and a seal retention ring encircling said outer surface portion and engaging said inflatable tube assemblies at the side thereof opposite from said seal support ring, said seal retention ring comprising a plurality of arcuate retention segments in end-to-end relation and comprising clamping means for clamping the segments to each other in end-to-end relation.

11. Apparatus as set forth in claim 10 further comprising a work platform ring encircling said outer surface portion and mounted on and supported by said retention segments of said seal retention ring, said work platform ring comprising a plurality of arcuate platform segments in end-to-end relation.

12. Apparatus as set forth in claim 10 wherein said means comprises an adjustable screw for engaging said outer surface portion and preventing said arcuate support segments from moving downward under load.

13. Apparatus as set forth in claim 12 wherein each of said inflatable tube assemblies comprises an inner inflatable portion engageable with said outer surface portion, an outer inflatable portion engageable with said inner surface portion and a membrane interconnecting and secured to said inner inflatable portion and said outer inflatable portion.

14. Apparatus as set forth in claim 13 further comprising resilient filler blocks intermediate and engaging adjacent ends of said inflatable tube assemblies and engaging said outer surface portion and said inner surface portion for providing a liquid seal between said adjacent ends.

15. Apparatus as set forth in claim 13 wherein each of said retention segments is intermediate said outer inflatable portion and said inner inflatable portion of said tube assemblies.

16. Apparatus as set forth in claim 15 wherein each of said arcuate retention segments has at least one adjustable screw means for engaging said outer surface portion and preventing said seal retention ring from moving upwardly when upwardly directed forces are applied thereto.

17. The method of reducing exposure of a human within the space between an inner tube co-axial with an outer tube to harmful radiation emitted by a radiation emitting structure within said inner tube, said inner tube having a liquid impenetrable outer surface portion which encircles at least a portion of said radiation emitting structure and said outer tube having a liquid impenetrable inner surface portion facing and coextensive with said outer surface portion and spaced from said outer surface to define said space, said space normally having liquid communication with the interior of said inner tube at one end of said space and said interior of said inner tube containing a liquid which absorbs said radiation, which covers said portion of radiation emitting structure and which normally enters into said space, said method comprising:

while maintaining said portion of said radiation emitting structure at least substantially covered by said liquid and maintaining said liquid in said space, installing a removable liquid seal at said one end of said space and in said liquid for preventing the flow of said liquid into said space from said interior of said inner tube after said liquid seal is installed; and thereafter, removing at least a portion of said liquid from said space at the side of said liquid seal opposite from said end of said space.

18. The method as set forth in claim 17 wherein each said inner tube and said outer tube is a shell of a steam generator and said inner tube and said outer tube are co-axial with a vertical axis, said radiation emitting structure is a plurality of tubes which are supplied with heated fluid containing radioactive particles during operation of the steam generator, said liquid is water and said end of said space is the lower end thereof.

19. The method as set forth in claim 18 wherein the installation of said liquid seal comprises encircling a circumferential portion of said outer surface portion of said inner tube at said end of said space with a plurality of inflatable tubes disposed end-to-end in liquid sealing relation and inflating said inflatable tues until said inflatable tubes engage said outer surface portion and said inner surface portion of said outer tube, said inflatable tubes also being deflatable and removable from between said inner tube and said outer tube.

20. The method as set forth in claim 19 further comprising providing an inflatable tube-supporting ring below said inflatable tubes before inflation thereof, said supporting ring comprising a plurality of arcuate ring segments encircling and engaging a circumferential portion of said outer surface portion of said inner tube and engaging said inner surface portion of said outer tube.

21. The method as set forth in claim 20 wherein each of said inflatable tubes comprises an outer inflatable portion and an inner inflatable portion secured together by a membrane and said membrane is placed in engagement with the upper surface of said supporting ring.

22. The method as set forth in claim 21 further comprising providing a seal retention ring intermediate said outer inflatable portion and said inner inflatable portion and on top of said membrane prior to inflating said outer inflatable portion and said inner inflatable portion, said seal retention ring comprising a plurality of arcuate retention segments which are placed successively end-to-end on said membrane and which are clamped together by clamping means, said retention segments having adjustable retention means which is movable into engagement with said outer surface portion of said inner shell.

23. The method as set forth in claim 22 wherein said outer surface portion of said inner tube has the shape of a truncated cone with its smaller diameter below the larger diameter.

24. The method as set forth in claim 22 further comprising superimposing a work platform segment on top of said seal retention ring.

25. The method as set forth in claim 22 further comprising superimposing a work platform ring on said seal retention ring by adding a plurality of arcuate work platform segments on top of said seal retention ring.

26. The method as set forth in claim 25 wherein said plurality of arcuate work platform segments are added after inflating said outer inflatable portion and said inner inflatable portion.

* * * * *

UNITED STATES PATENT AND TRADEMARK OFFICE
CERTIFICATE OF CORRECTION

PATENT NO. : 5,192,492
DATED      : March 9, 1993
INVENTOR(S) : Gately et al

It is certified that error appears in the above-identified patent and that said Letters Patent is hereby corrected as shown below:

On the title page, under "[73] Assignee:", "Consolidation" should read --Consolidated--.

Column 10, line 68, "sad" should read --said--.

Column 12, line 6, "as" should read --a--.

Signed and Sealed this

Seventh Day of December, 1993

Attest:

BRUCE LEHMAN

Attesting Officer

Commissioner of Patents and Trademarks